Roger Léger Marie Fernand Rouanet
François Victor André Joseph Rey
INVENTORS
By *Otto Munk*
their ATTY.

Jan. 9, 1940.  R. L. M. F. ROUANET ET AL  2,186,558
AIRCRAFT
Filed May 18, 1938   6 Sheets-Sheet 4

Roger Léger Marie Fernand Rouanet
François Victor André Joseph Rey
INVENTORS

Jan. 9, 1940.  R. L. M. F. ROUANET ET AL  2,186,558
AIRCRAFT
Filed May 18, 1938   6 Sheets-Sheet 5

Roger Léger Marie Fernand Rouanet
François Victor André Joseph Rey
INVENTORS

Jan. 9, 1940.  R. L. M. F. ROUANET ET AL  2,186,558
AIRCRAFT
Filed May 18, 1938  6 Sheets-Sheet 5

Rogers Léger Marie Fernand Rouanet
François Victor André Joseph Rey
INVENTORS

Patented Jan. 9, 1940

2,186,558

UNITED STATES PATENT OFFICE 2,186,558

AIRCRAFT

Roger Léger Marie Fernand Rouanet and François Victor André Joseph Rey, Paris, France Application May 18, 1938, Serial No. 208,596
In France May 24, 1937

13 Claims. (Cl. 244—38)

This invention relates to aeroplanes.

One object of the invention is to provide an aeroplane in which the variations of the forces supported by the wings during flight are limited. A further object of the invention is to provide an aeroplane having a high stability and comprising improved means for lateral control. A still further object of the invention is to provide an aeroplane affording an increased comfort for the passengers. Other objects and advantages of the invention will be set forth in the following description.

These and other objects of the invention are attained in an aircraft in which each supporting wing is pivoted to the central body about an axis which is oblique to the longitudinal plane of symmetry of the machine and whose direction is such as to obtain, during the pivoting movement of the wing under the action of the aerodynamic overloads to which it is subjected, a variation of the incidence in the proper direction for automatically limiting said overloads, the maintenance of the wing in the position of equilibrium being ensured by elastic and eventually damping connections whose deformation under the action of said overloads will permit a pivoting of the wing on said axis.

According to a further characteristic, the wings are connected together by a device providing for lateral equilibrium, by which the machine will remain unaffected by disturbing actions tending to incline it laterally.

In the accompanying drawings, which are given solely by way of example.

Figures 1, 2:
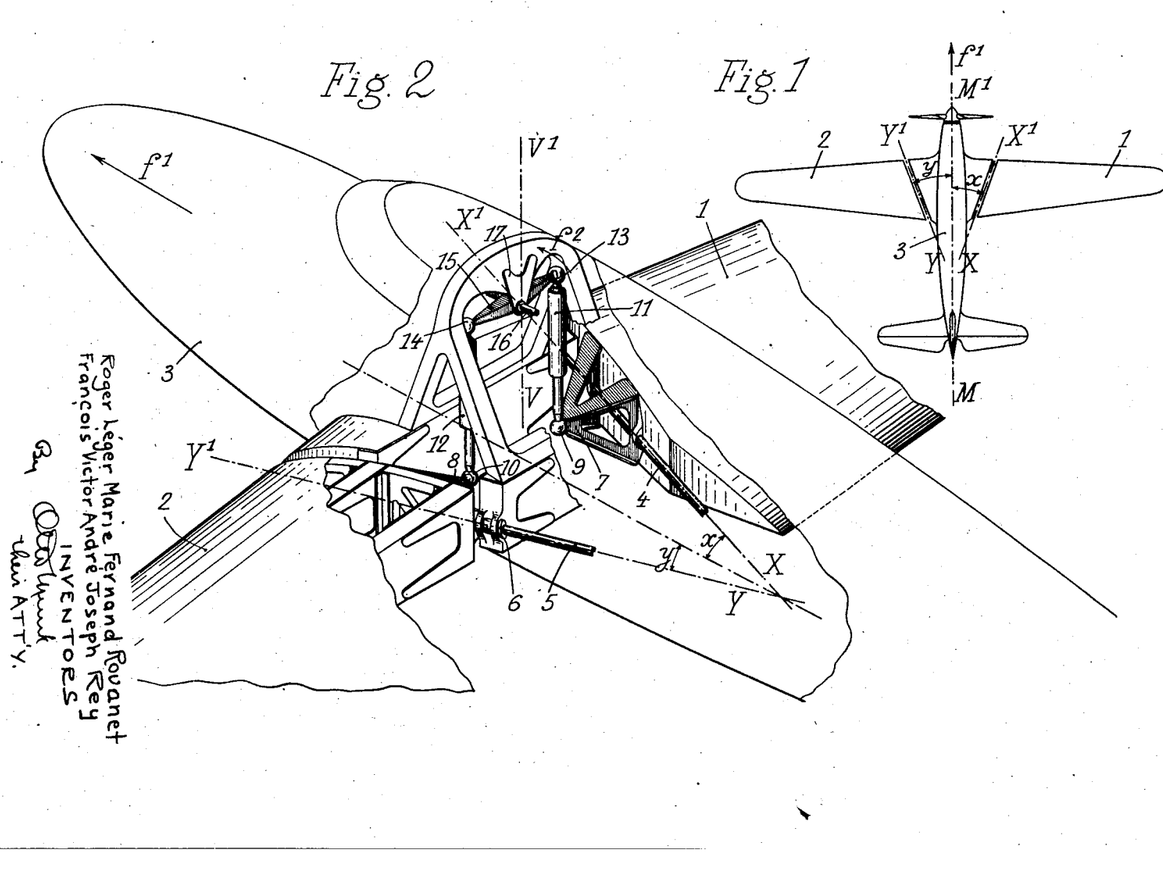
Fig. 1 is a diagrammatic plan view of an aeroplane in accordance with the invention.
Fig. 2 is a perspective view showing a practical embodiment of the said aeroplane.

In the embodiment shown in Figs. 1 and 2, the wings 1 and 2 of the aeroplane are pivotally mounted on the central body or fuselage 3, upon two journals or shafts 4 and 5 whose respective axes $X X^1$ and $Y Y^1$ are oblique with reference to the longitudinal plane of symmetry $M M^1$ of the apparatus, said shafts being journalled in suitable bearings such as 6 carried by the central body 3.

The angles $x$ and $y$, which are formed by the respective oblique axes $X X^1$ and $Y Y^1$ with the plane $M M^1$, have their openings in the direction of travel of the aeroplane, as shown by the arrow $f^1$.

Each wing is extended beyond its pivoting axis by an appendage 7, 8, of pyramidal, conical or like form, at whose ends are pivotally mounted at 9 and 10, for instance by ball-and-socket joints, two elastic and eventually damping connections 11 and 12. The said connections are pivotally mounted at 13 and 14, for instance by ball-and-socket joints, upon a rocking lever 15 which is pivotally mounted on a shaft or journal 16 secured to a member 17 which is mounted on the main body 3 (eventually in such a manenr as to be movable relatively to said body).

As will be readily understood, since the angle $x$ or $y$ has its opening directed in the direction of travel of the aeroplane, an upward pivoting of the wing 1 (for instance) about the axis $X X^1$ will reduce the incidence of this wing. If, on the contrary, the wing should pivot downwardly about the axis $X X^1$, its incidence will increase. It will be further noted that the greater is the angle, the greater will be the variation of the incidence of the wing (for a given rotation of the said wing about the axis $X X^1$).

In these conditions, since the aerodynamic forces upon the wing are counterbalanced by the elastic device 11, the pivoting of the wing will automatically limit the variations of such aerodynamic forces. In fact, if the wing is subjected to an overload which will cause it to turn about $X X^1$ in the upward direction, for instance, the resulting diminution of the incidence due to the rotation will cause a diminution of the said overload.

In fact, the forces supported by the wings 1 and 2 are respectively transmitted by the appendages 7 and 8 and then by the elastic connections 11 and 12 to the rocking lever 15 which is rotatable about the shaft or journal 16 parallel to the plane of symmetry M $M^1$ of the aeroplane and secured to the central body 3 of the aeroplane.

Owing to the transmission of the forces from one wing to the other by means of the member 15, the aeroplane will be made irresponsive to unsymmetrical lateral disturbances.

In fact, if the wing 1 should receive an accidental overload in the upward direction, for instance, its rotation about X $X^1$ will cause on the one hand, according to the preceding considerations, a variation of the incidence of the said wing whereby this overload will be reduced, and on the other hand, it will cause, through the members 7, 11, 15, 12 and 8, a downward rotation of the wing 2 about Y $Y^1$, thus increasing the incidence of this wing which will hence be subject to an aerodynamic overload in the upward direction, thus acting against the lateral inclination of the aeroplane due to the original overload on the wing 1.

Moreover, if the pilot should produce, by a suitable control, a pivoting of the rocking lever 15 in the direction of the arrow $f^2$ (Fig. 2), for instance, this pivoting of the said lever will cause, at the same time, by means of the transmission members, a downward movement of the wing 1 about X $X^1$ and an upward movement of the wing 2 about Y $Y^1$, resulting in a variation of the aerodynamic forces in contrary directions upon the two wings, which will cause the lateral inclination of the aeroplane in the direction of the arrow $f^2$, in the example chosen.

The device will thus provide, at the exclusion of the use of other controlling means, for the lateral inclination of the aeroplane as the pilot may desire (lateral control).

The device permits also of varying simultaneously and in the same direction, the aerodynamic forces to which the two wings are subjected, by displacing vertically (on the line V $V^1$ of Fig. 2) the axis of rotation 16 of the rocking lever 15, or by modifying the characteristics (diagrams of the deformations in function of the loads) of the elastic connections 11 and 12.

The device will definitively permit:

Of limiting the variations of the forces upon the aeroplane wings during flight;

Of providing for the stability and the lateral control of the aeroplane;

Of increasing the comfort of the passengers;

Of observing at all times, by the deformation of the elastic connections 11 and 12, the forces exerted upon the wings during flight, and to thus inform the pilot (automatically if desired) when such forces become excessive (limit of safety of the construction) or insufficient (loss of speed);

Of modifying simultaneously and in the same direction, by the vertical displacement of the rocking lever or by the modification of the characteristics of the elastic connections, the position of equilibrium of the wings with reference to the central body, and hence the aerodynamic forces to which they are subjected and the conditions of flight of the aeroplane.

Figure 3:
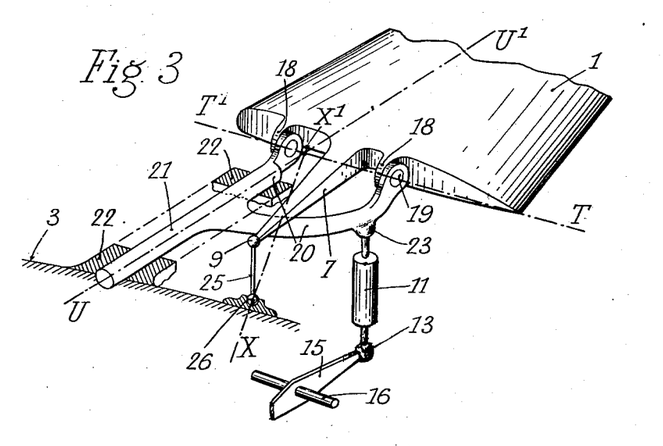
Fig. 3 is a perspective view showing the manner for the pivoting of a wing about a virtual oblique axis.

In the embodiment shown in Fig. 3, the wing 1 is pivotally mounted by hinges 18 and 19 (whose axis $TT^1$ may be parallel to the longitudinal plane of symmetry of the machine) on the ends of a member 20 whose arm 21 is journalled in bearings 22 which are rigidly secured to the central body 3 of the machine. The axis $UU^1$ of the said bearings, which may for instance be located transversely relatively to the machine, intersects the axis $TT^1$ at $X^1$ and may for instance be perpendicular to this axis.

Upon the member 20 is pivotally mounted at 23, for instance by a rotula, an elastic damping connection 12 which is pivoted at the other end (for instance by a rotula) to one end of a rocking lever 15 which is adapted to turn about a shaft or journal 16 secured to the central body 3 of the machine, and whose other end is connected to the symmetrical elastic damping connection of the other wing (2).

The wing 1 comprises an appendage 7 which is pivotally connected at 9, by a rotula for instance, to a link 25, which is in turn pivoted (for instance by a rotula 26 whose centre is X) to the central body 3 of the machine.

It will be observed that the wing 1, by the effect of the variations of the aerodynamic forces acting upon it, may turn with reference to the member 20 about the axis $TT^1$, and the member 20, which is maintained in an elastic manner by the elastic connection 11, may turn about the axis $UU^1$, so that the wing will finally take a resulting position which is such that the point 9 will always remain, owing to the link 25, at a constant distance from the centre X.

In fact, the whole action takes place as if the device 1, 7, 25 turned about the virtual axis $XX^1$, which fulfills the same functions as the real axis in the construction shown in Fig. 2, as well as in the embodiments to be hereinafter described. On the other hand, in this construction, the lateral balancing is obtained by the connection by rocking lever 15 provided between the two wings, through the medium of their elastic connecting members 11, 12.

Whether the axis of rotation of each wing is real or virtual, this axis may have different positions with reference to the longitudinal plane of symmetry of the aeroplane.

Figure 4:
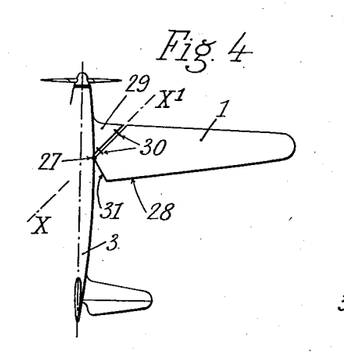
Figs. 4, 5 and 6 are diagrammatic plan views showing various positions of the pivot axis on an aeroplane wing.

In the construction shown in Fig. 4, the pivoting axis $XX^1$ (real or virtual) is situated in such manner as to meet the central body 3 (at a point 27) in front of the trailing edge 28 of the wing. This arrangement has the advantage of reducing the fixed part 29 of the wing to a minimum, this being the part which does not participate in the advantages given to the movable part 1 by the device providing for pivoting and for lateral balancing. It may be realized, for instance, by two hinges 30 which are placed next the front framework of the wing, and the rear part of the wing, which is adjacent the central body, may be joined to the central body by a flexible connection (in sheet-metal or rubber, for instance) in order to prevent aerodynamic whirls, or may be cut at 31 adjacent the fuselage, as shown in Fig. 4.

Figure 5:
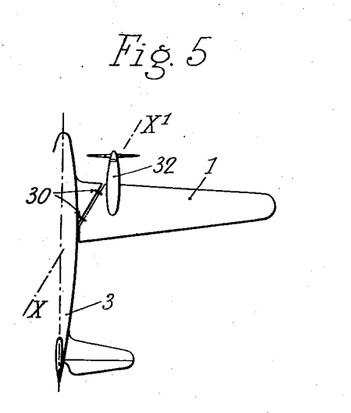

In the construction shown in Fig. 5, the aeroplane is provided with lateral engines 32 which are mounted on the wings, and the oblique pivoting axis $XX^1$ of each wing is located in such a manner that the lateral engine or engines (situated on either side of the central body) will be located upon the movable part of the corresponding wing. It will be noted that if the direction of rotation of each engine is such that it produces a reversing torque which tends to incline downwardly the wing by which it is supported, the arrangement illustrated will have the advantage of affording an automatic reduction of the incidence of this wing (in the case of stopping or of a reduction in the power of this engine) and of increasing the incidence of the other wing, due to the operation of the lateral balancing device. This will produce a yawing moment in the contrary direction to the one produced by the engine or engines which are still running upon the other wing. Hence the machine will travel in better conditions than an ordinary machine in the case of a breakdown or a reduction in the speed of an engine.

Figure 6:
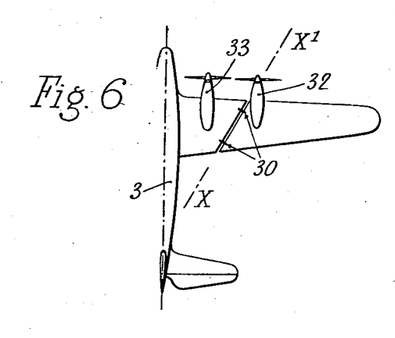

Fig. 6 is a plan view of an aeroplane which is provided for instance with four lateral engines, each wing carrying two engines 32 and 33, and the oblique pivoting axis of this wing located between these two engines. This construction affords the advantage above mentioned in the case of a breakdown of an engine situated upon the movable part of the wing, while at the same time reducing the inertia of this movable part with reference to the central part carrying the pivoting axis.

It is to be noted that in general, in the case of aeroplanes in which a portion of each wing comprises compartments for passengers, commercial load or fuel, or supports engines, the pivoting axis $XX^1$ of each wing may be located immediately after the last engine or after the part occupied by the commercial load or fuel; it might also be located at any point of this portion accommodating commercial load, fuel or engines, in order to obtain any particular effect which may be desired.

Figure 7:
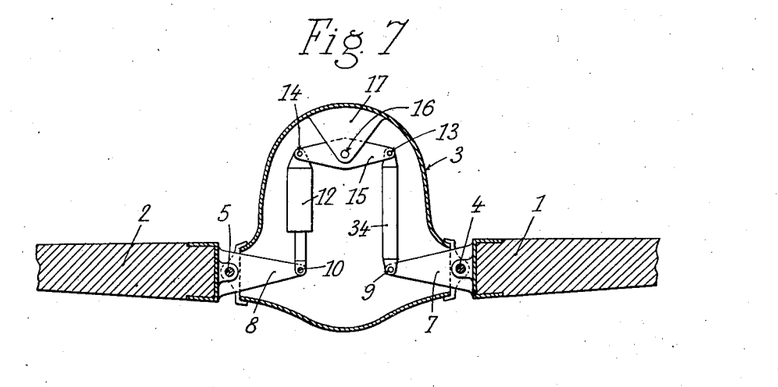
Figs. 7, 8 and 9 are vertical cross-sections of various arrangements of the elastic connections, in the case of the utilization of a device for lateral balancing comprising a mechanical rocking lever.

The modified arrangement of the elastic connections shown in Fig. 7 differs from the first arrangement above described, due to the sole fact that it comprises only a single elastic damping connection, the other being replaced by a simple rigid link 34.

Figure 8:
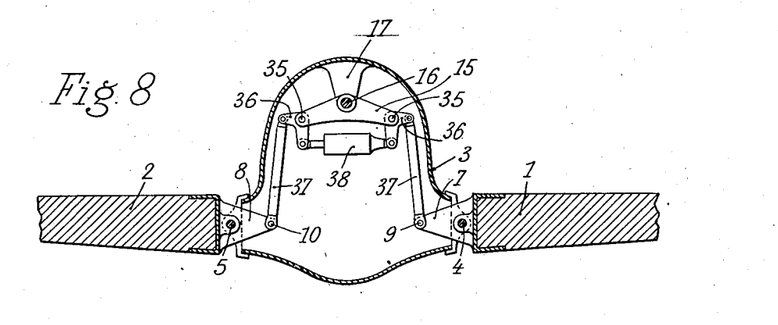

In the modification shown in Fig. 8, the rocking lever 15 is pivoted at its centre, about an axis 16, upon the member 17 which is secured to the body 3 of the machine. At each end of said rocking lever, a bell-crank lever 36 is pivoted about an axis 35. One arm of each bell-crank lever 36 is connected by a link 37 to the appendage 7 or 8 of the corresponding wing 1 or 2, whilst the other arms of the bell-crank levers 36 are connected together by a single elastic and damping connection 38.

It should be further observed that by way of modification this arrangement can be changed by eliminating the rocking lever 15, the axles 35 being now secured to the central body 3 of the machine. It will be readily noted that this modification also provides (if the levers 36 are of suitable size) for the lateral balancing of the machine.

Figure 9:
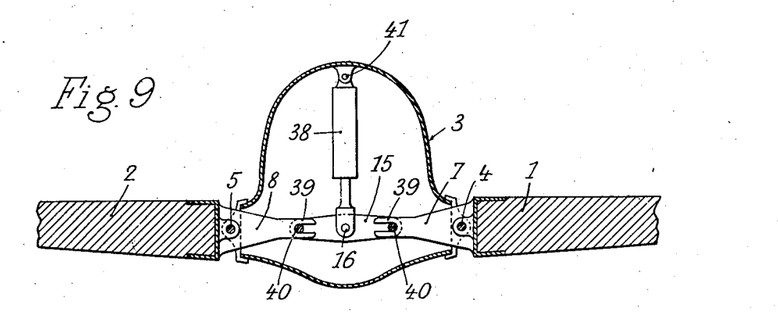

In the embodiment shown in Fig. 9, the appendages 7, 8 of the wings 1, 2 are directly connected, for instance by a fork 39, to pins 40 carried by a rocking lever 15 which is pivoted at its centre on an axle 16 secured to a single elastic and damping connection 36 which is connected at 41 to the central body 3 of the aeroplane.

Figures 10, 11:
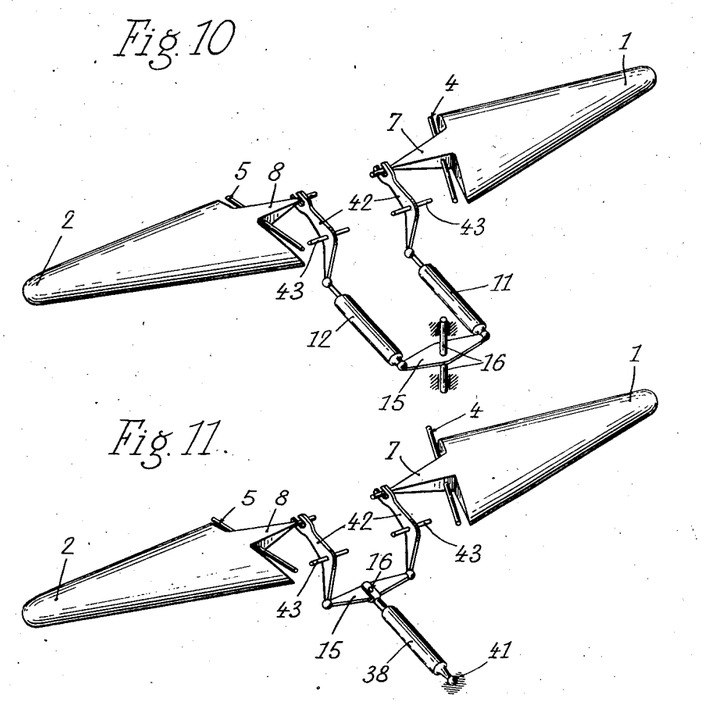
Figs. 10 and 11 are perspective views of two modifications of the arrangement of the elastic connections, with a mechanical rocking lever.

In the embodiment shown in Fig. 10, the appendages 7, 8 of the wings 1, 2 actuate, respectively, the arms of two bell-crank levers 42 which are rotatable on transverse axles 43 secured to the central body of the machine. The other arms of said bell-crank levers are connected to respective elastic damping connections 11 and 12, whose other ends are pivoted to the respective ends of a rocking lever rotatable on an axle 16 secured to the central body of the machine. It will be noted that this arrangement permits of placing the elastic connections and the lateral balancing device in a longitudinal position, whereby the space occupied in the central body of the machine may be reduced, and in certain cases the installation of commercial load in this central body facilitated.

In the modification shown in Fig. 11, the bell-crank levers 42 are connected directly to the ends of the rocking lever 15, whose axle 16 is connected, by an elastic damping device 38, to a fixed point 41 on the central body of the machine.

Figure 12:
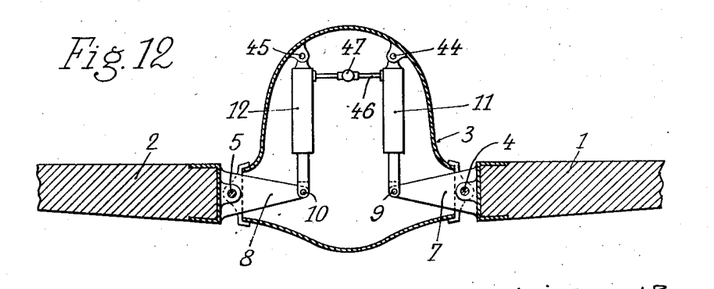
Figs. 12 and 13 are vertical cross-sections showing two modifications employing a device for lateral balancing which comprises no mechanical rocking lever.

In the embodiment shown in Fig. 12, to the appendages 7 and 8 of the wings are pivoted, at 9 and 10, elastic damping connections of the fluid type, 11 and 12. Each of the said connections is pivotally connected, independently of the other, at 44, 45, to the central body 3 of the machine. The said elastic damping connections are interconnected by one (or more) conduit 46 which permit of establishing between them an equality of pressure of the internal fluid and hence the lateral equilibrium of the wings. On the said conduit or conduits is provided a cock 47 which permits either of cutting off the connection between the two devices 11 and 12 and thus to eliminate the lateral balancing of the two wings 1 and 2, or to effect, by opening the cock, the equalizing of the pressure in the elastic connections 11 and 12 and hence the desired lateral balancing between the two wings. The greater or less opening of the cock may also permit (owing to the variation of the flow section of the fluid) to damp, to a suitable degree, the operation of this lateral balancing device.

It is observed that the same arrangement can be employed in the case of the use of elastic connections of any kind, and in this event the balancing device may consist of a transmission using an incompressible fluid (of the hydraulic type, for instance) connecting the ends of the elastic connections, which are also pivoted to the appendages 7 and 8. The said transmission may consist for example of one or more connecting conduits such as 46, provided with a cock (this cock serving the same purpose as the aforesaid cock 47), leading to two pump bodies which are pivotally mounted on the central body of the machine at points such as 44, 45. The elastic connections 11 and 12 are pivotally connected at one end to the appendages 7 and 8, and at the other end to the respective pistons of each of the two pump bodies.

Figure 13:
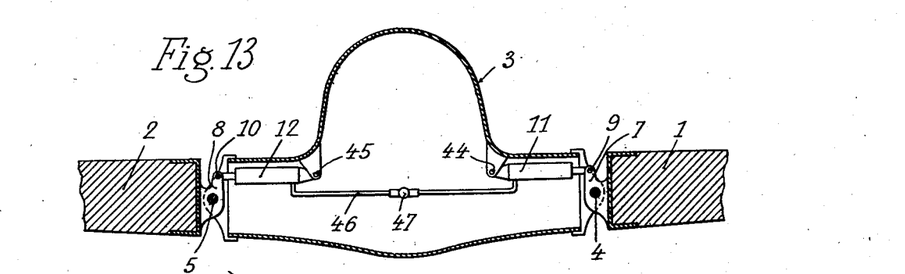

Fig. 13 is a vertical cross-section of another arrangement of the elastic damping connections 11 and 12, which differs from the one shown in Fig. 12 only by the position of the several parts of the device.

By way of modification, the arrangement shown in Fig. 13 may be changed, by simply connecting the parts 7 and 8 by a rigid transmission in which an elastic connection is interposed, this arrangement providing for the desired lateral balancing. In this modification the damping devices (if such are used) will act separately upon each wing, and they are mounted between the central body 3 and a member secured to each movable wing.

It is to be understood that the balancing devices herein described may be employed with the various arrangements of elastic connections above set forth, and chiefly to the ones corresponding to Figs. 3, 7, 10 and 11, and in this case the rocking lever shown in these figures will be replaced by one of the balancing devices above indicated.

In the various embodiments above set forth, the connections 11 and 12 (or the single connection 38) serve both as elastic connections and as damping devices. These two functions may be fulfilled in all cases, and chiefly in the cases above described by way of example, by separate devices, i. e., by elastic connections such as springs subject to flexion and/or torsion, compression, traction, plate or coil springs, tubular or not, elastic cords, rubber washers, elastic connections of the fluid type, etc. and separately by damping devices properly so called, such as damping devices or shock-absorbers of the fluid or the friction type, etc., whose size may consequently be suitably reduced. Each damper can thus act separately upon the movement of each wing, to which it is connected (by means of the corresponding member 7 or 8, or of any suitable point of the said movable wing), its other end being pivotally connected to a fixed point of the central body of the machine or of the fixed part of the corresponding wing.

It should be further noted that in certain cases, (particularly where the aerodynamic damping action acting upon the wings is sufficient) the damping devices proper may be eliminated.

Figures 14, 15, 16:
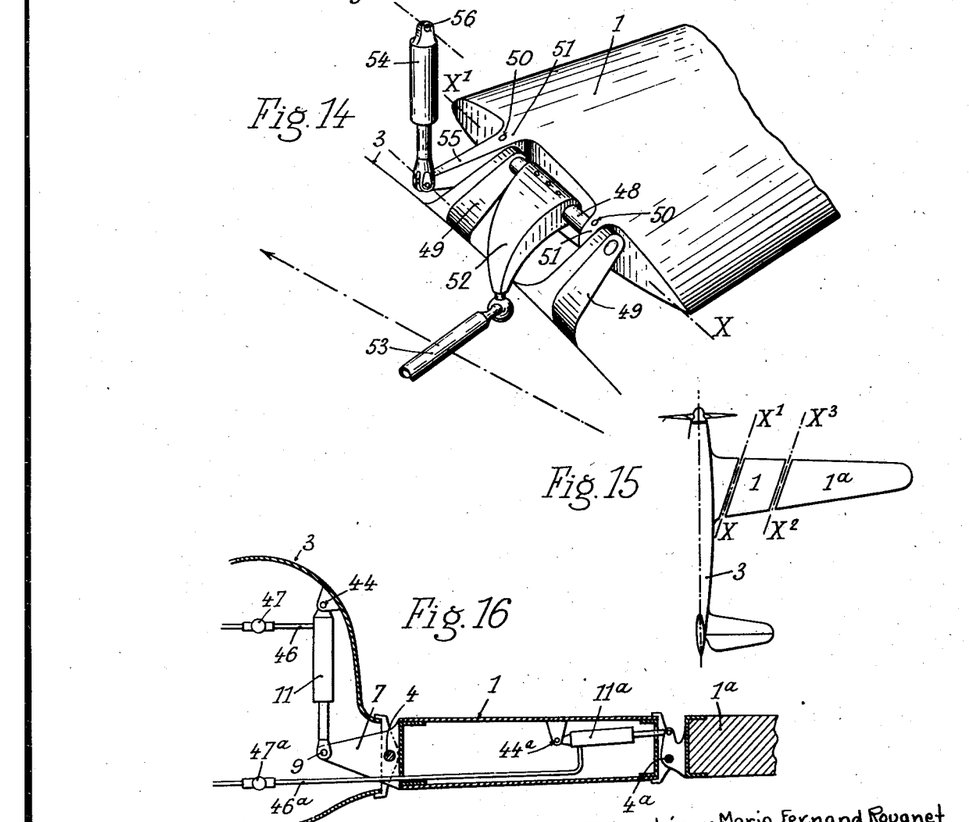
Fig. 14 is a perspective view of a modification in which the elastic connection for each wing consists of a member subject to torsion, with the addition of a damping device acting separately, and of a coupling device mounted between the elastic connections in order to obtain the lateral balancing of the wings.
Fig. 15 is a plan view of an aeroplane in which each wing consists of several sections which are pivoted together by means of oblique axles (which may be parallel or not).
Fig. 16 is a vertical cross-section of the said aeroplane.

Fig. 14 shows by way of example an embodiment in which use is made of elastic connections which are subject to torsion, the damping devices proper (if any used) being distinct members. In this case, the elastic connection operating by torsion consists of a member 48 which is situated on the pivot axis $XX^1$ of the wing 1 and which is rotatably supported in two bearings 49 mounted on the central body 3. This member 48 is keyed at both ends, at 50, to members 51 secured to the wing 1, and upon it is rigidly mounted an appendage 52 whose end is pivoted (for instance by a rotula) to one end of a transverse link 33 for lateral balancing, whose other end is pivoted in like manner to the end of the corresponding symmetrical appendage of the other wing. For each wing, the damping device 54 (if such is used), located in the central body of the machine, is pivotally connected at one end to a member 55 secured to the wing 1, and at the other end at a point 56 of the central body of the machine.

It is to be understood that this last-mentioned embodiment can also be used in the case in which the pivot axis is at some distance from the central body, and it is simply necessary to suitably choose the length and the form of the appendage 52 and of the member 55, and to modify the arrangement of the damping device 54 (if such is used) in order that these parts may be mounted in the interior of the fixed part of the wing while permitting the necessary movements of these parts when the wing 1 turns about $XX^1$. For instance, the damping device 54 (located in the interior of the fixed part of the wing may be connected to the member 51, (whose length is suitably reduced according to the maximum degree of movement of the wing) either directly or through the medium of one or more bell-crank levers (for instance with rotula joints).

Figs. 15 and 16 are respectively a plan view and a diagrammatic section of a constructional form of the device mounted on an aeroplane in which each wing comprises a plurality of oblique joints according to the invention. The journals 4 and $4^a$ shown in Fig. 16 constitute the pivot axes $XX^1$ and $X^2X^3$ of Fig. 15 (which oblique axes are obviously not perpendicular to the plane of Fig. 16).

Each section of a wing is laterally balanced with the corresponding section of the other wing. It is observed that the cocks 47 and $47^a$ may be operated separately or together. It is further noted that this manifold pivoting of the wing may be attained by using one of the arrangements above indicated, and elastic connections such as those above described (particularly Figs. 7, 8, 9, 10, 11, 12 and 13 for the joints 4, and in Figs. 13 and 14 for the joints $4^a$, including the modifications described with reference to these different figures).

Figure 17:
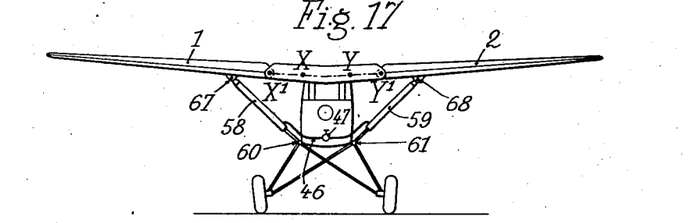
Figs. 17, 18, 19 and 20 are front views of aeroplanes of different types, provided with the device.
Figure 18:
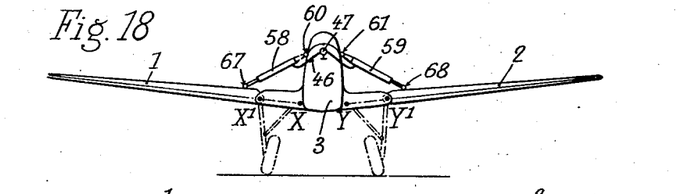

Figs. 17 and 18 represent examples of the use of the device, respectively for a high wing monoplane and for a low wing monoplane provided with struts. In plan view the arrangement of the oblique hinge axes for the wings of these aeroplanes may be, for these two examples, similar to the arrangement shown in Fig. 4. The elastic damping connections are interposed in the struts at 58 and 59. If these connections are of the fluid type, the lateral balancing is obtained by one or more conduits 48 provided with a cock 47 as in the devices shown in Figs. 12, 13 and 16. If they are of any suitable kind, the lateral balancing is obtained by a device using an incompressible fluid (hydraulic for instance) of the same type as the one described with reference to Fig. 12 (modification), and interposed in the struts of the machine, with one or more connecting conduits such as 46 provided with a cock 47. One end of the struts 58, 59 is pivotally connected to the central body 3 at 60, 61 and the other end to the wings at 67, 68.

Figure 19:
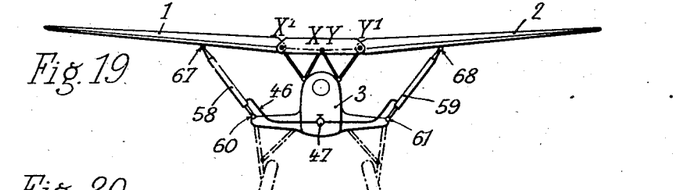
Figure 21:
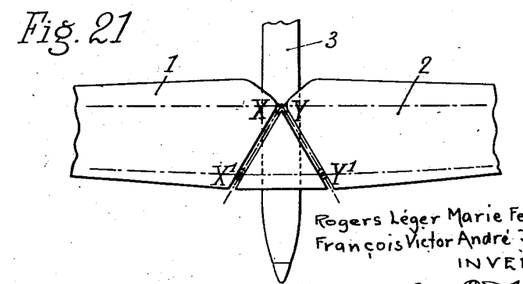
Fig. 21 is a plan view showing the position of the pivot axes on the wings represented in front view in Fig. 19, and on the upper wings represented in front view in Fig. 20.

Figs. 19 and 21 show an example of the use of the above-mentioned devices upon a sesquiplane. The hinge axes of the wings are materially represented by the points $XX^1$, $YY^1$ forming the apexes of the centre section pyramid. The elastic damping connections are interposed in the struts, and the lateral balancing is obtained as in the preceding case.

Figure 20:
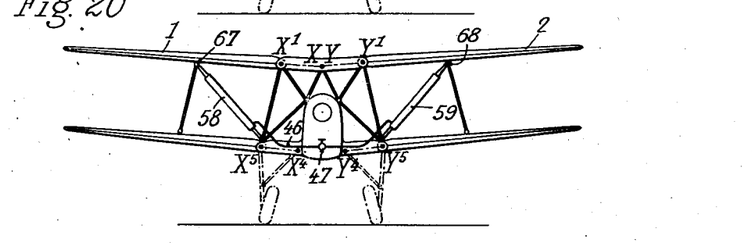

Fig. 20 represents an example of the use of the same devices upon a biplane with bracing wires. The upper wings are pivoted on two oblique axles which, as before, are materially represented by the apexes $XX^1$, $YY^1$ of the centre section pyramid, and the lower wings are pivoted on oblique axes $X^4X^5$, $Y^4Y^5$, which are located, in plan view, as in the diagrammatic view Fig. 4. In order to provide for the rotation of the cell-girders about the pivot axes, the elastic damping connections 58, 59 serve as cross-braces for the transverse girders of the cell, and on the other hand, all of the attaching points of the bracing wires and cross-braces consist of joints (for instance with rotula).

Obviously, the invention is not limited to the embodiments herein described and represented, which are given solely by way of example.

Having now described our invention, what we claim as new and desire to secure by Letters Patent is:

1. In a flying machine, the combination with a central body, of two supporting wings each of which is adapted to pivot relatively to said central body about a virtual axis which is oblique to the longitudinal plane of symmetry of said central body, the pivoting of the wing about said virtual axis being the result of elementary rotations of the wing about other axes, and elastic means for normally maintaining the wings in a position of equilibrium.

2. In a flying machine, the combination with a central body of two wings each of which is adapted to pivot about two concurrent axes, a radius rod connection between a point of the wing and a fixed point of said central body, whereby the rotations of the wing about said two concurrent axes result in a rotation about a virtual axis determined by the common point of said two concurrent axes and said fixed point, and means for normally maintaining the wings in a position of equilibrium.

3. In a flying machine, the combination with a central body, of two supporting wings each of which is adapted to pivot relatively to said central body, about an axis which is oblique to the longitudinal plane of symmetry of said central body, at least one lateral engine mounted on the movable wing portion, and elastic means for normally maintaining the wings in a position of equilibrium.

4. In a flying machine, the combination with a central body of two wings each of which is adapted to pivot relatively to said central body about an axis which is oblique to the longitudinal plane of symmetry of said central body, and includes an appendage extending inwardly from said axis, and connecting means for operatively connecting together the inner ends of said appendages and including resilient connections arranged longitudinally with reference to said central body and rigid linkages, the arrangement being such that when one wing pivots in one direction relatively to said central body, the other wing is caused to pivot in the opposite direction.

5. In a flying machine, the combination with a central body, of two wings each of which comprises a plurality of sections, said sections being pivotally connected to one another and the inner section being pivotally connected to said central body, about axes which are oblique to the longitudinal plane of symmetry of said central body, and resilient connecting means between each section of one wing and the corresponding section of the other wing for operatively connecting together said sections so that when a section of one wing pivots about its hinge axis in one direction, the corresponding section of the other wing is caused to pivot in the opposite direction about its hinge axis.

6. In a flying machine, the combination with a central body, of two supporting wings each of which is pivotally connected to said central body for pivoting about an axis which is oblique to the longitudinal plane of symmetry of said central body, and connecting means for operatively connecting together said two wings so that when one wing pivots in one direction relatively to said central body, the other wing is caused to pivot in the opposite direction relatively to said central body, said connecting means including a swingle bar pivoted to said central body and elastic connections between each end of said swingle bar and a point of one of said wings, respectively.

7. In a flying machine, the combination with a central body, of two supporting wings each of which is pivotally connected to said central body for pivoting about an axis which is oblique to the longitudinal plane of symmetry of said central body, and connecting means for operatively connecting together said two wings so that when one wing pivots in one direction relatively to said central body, the other wing is caused to pivot in the opposite direction relatively to said central body, said connecting means including a swingle bar pivoted to said central body, an elastic connection between one end of said swingle bar and one of said wings and a rigid connection between the other end of said swingle bar and the other of said wings.

8. In a flying machine, the combination with a central body, of two supporting wings each of which is pivotally connected to said central body for pivoting about an axis which is oblique to the longitudinal plane of symmetry of said central body, and connecting means for operatively connecting together said two wings so that when one wing pivots in one direction relatively to said central body, the other wing is caused to pivot in the opposite direction relatively to said central body, said connecting means including a swingle bar pivoted to said central body, a bell-crank lever pivotally connected to each end of said swingle bar, a rigid connection between one arm of each of said bell-crank-levers and one of said wings, respectively and an elastic connection between the other arms of said bell-crank-levers.

9. In a flying machine, the combination with a central body, of two supporting wings each of which is pivotally connected to said central body for pivoting about an axis which is oblique to the longitudinal plane of symmetry of said central body, and connecting means for operatively connecting together said two wings so that when one wing pivots in one direction relatively to said central body, the other wing is caused to pivot in the opposite direction relatively to said central body, said connecting means including a swingle bar, resilient connecting means between an intermediate point of said swingle bar and said central body and connections between each end of said swingle bar and one of said wings respectively.

10. In a flying machine, the combination with a central body of two wings each of which is adapted to pivot relatively to said central body about an axis which is oblique to the longitudinal plane of symmetry of said central body, and includes an appendage extending inwardly from said axis into said central body, and a fluid cushioned connection between the inner end of each of said appendages and said central body and conduit means between said connections for balancing the pressure of the fluid contained therein.

11. In a flying machine, the combination with a central body, of two supporting wings, a torque bar for resiliently connecting each of said wings to said central body, the two torque bars converging rearwardly toward the longitudinal plane of symmetry of said central body.

12. In a flying machine, the combination with a central body, of two torque bars pivotally mounted on said central body, a supporting wing keyed on each of said torque bars and a connection between said torque bars for normally maintaining the wings in a position of equilibrium.

13. A flying machine as claimed in claim 12, further comprising a damping connection connecting a point of each wing to a fixed point of said central body.

ROGER LÉGER MARIE
      FERNAND ROUANET.

FRANÇOIS VICTOR ANDRÉ
      JOSEPH REY.